W. A. RIDDELL & R. KROEDEL.
LENS CARRIAGE FOR PHOTOGRAPHIC CAMERAS.
APPLICATION FILED MAR. 23, 1914.
1,143,782.
Patented June 22, 1915.
2 SHEETS—SHEET 1.
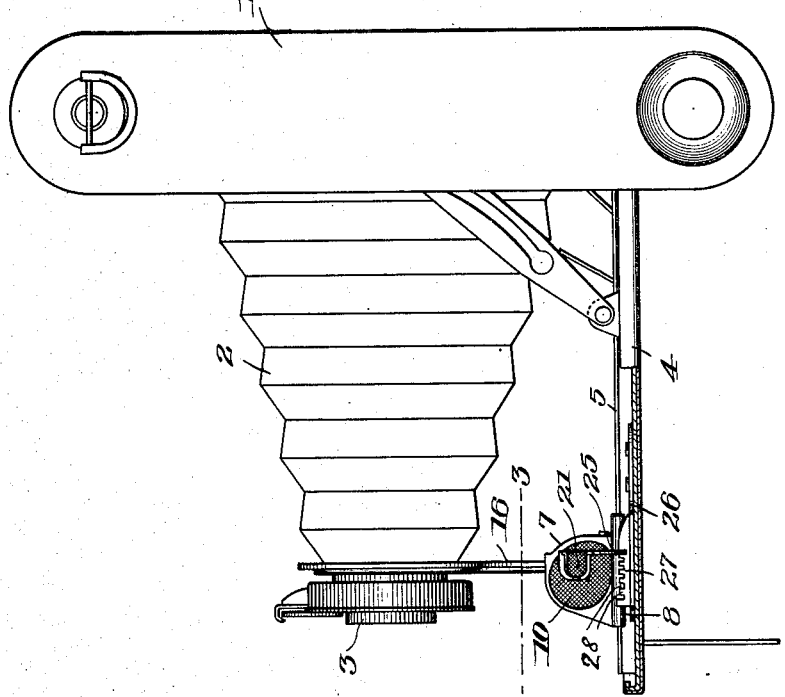
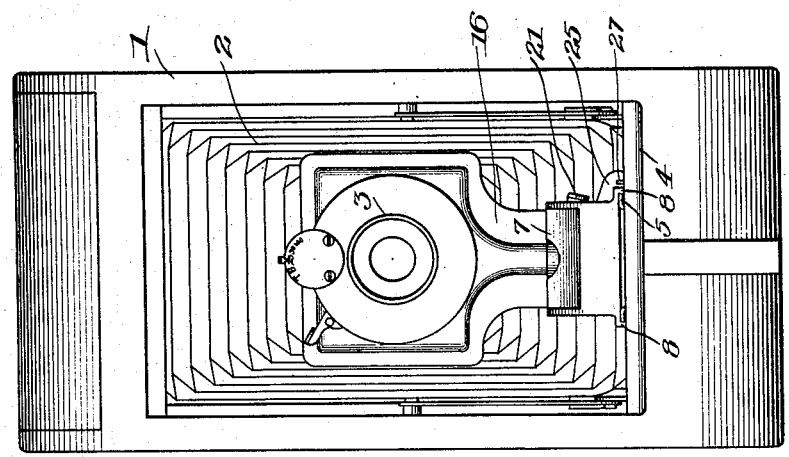
Witnesses
Inventors
William A. Riddell
Robert Kroedel
their Attorneys

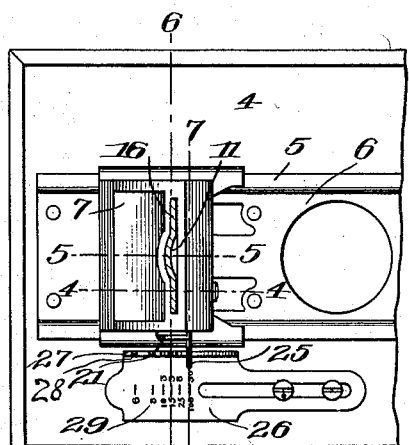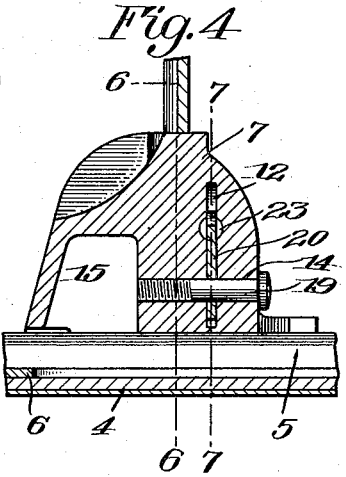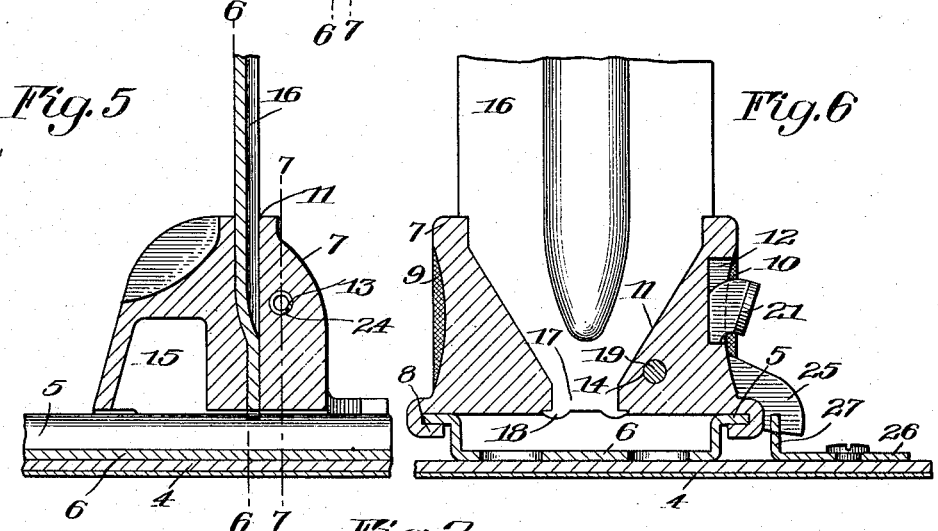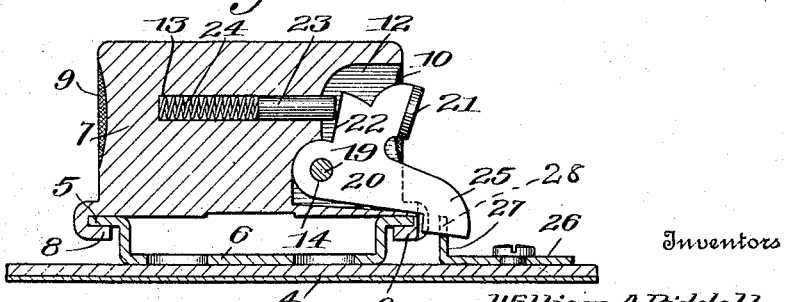

UNITED STATES PATENT OFFICE.

WILLIAM A. RIDDELL AND ROBERT KROEDEL, OF ROCHESTER, NEW YORK, ASSIGNORS TO EASTMAN KODAK COMPANY, OF ROCHESTER, NEW YORK, A CORPORATION OF NEW YORK.

LENS-CARRIAGE FOR PHOTOGRAPHIC CAMERAS.

1,143,782.

Specification of Letters Patent. Patented June 22, 1915.

Application filed March 23, 1914. Serial No. 826,745.

*To all whom it may concern:*

Be it known that we, WILLIAM A. RIDDELL and ROBERT KROEDEL, both of Rochester, in the county of Monroe and State of New York, have invented certain new and useful Improvements in Lens-Carriages for Photographic Cameras; and we do hereby declare the following to be a full, clear, and exact description of the same, reference being had to the accompanying drawings, forming a part of this specification, and to the reference-numerals marked thereon.

Our present invention relates to photography and more particularly to photographic cameras of the folding or extensible type in which the lens is moved along its axis relatively to the recording surface on a front or carriage to regulate the focus and our invention has for its object to provide a simple, cheap and efficient construction of lens carriage that can be easily assembled and mounted in position on the camera bed.

The improvements are further directed to the locking device carried by the carriage and coöperating with the bed to lock the lens in different positions of focal adjustment.

To these and other ends the invention consists in certain improvements and combinations of parts all as will be hereinafter more fully described, the novel features being pointed out in the claims at the end of the specification.

In the drawings: Figure 1 is a front elevation of a camera provided with a lens carriage constructed in accordance with and illustrating one embodiment of our invention; Fig. 2 is a side elevation thereof partly in section through the bed; Fig. 3 is a top plan view of the carriage and bed taken in horizontal section through the lens board on the line 3—3 of Fig. 2; Fig. 4 is an enlarged detail section taken vertically and longitudinally through the carriage and adjacent portions of the bed on the line 4—4 of Fig. 3; Fig. 5 is a similar view on the line 5—5 of Fig. 3; Fig. 6 is a similar view but taken in transverse section on the lines 6—6 of Figs. 3, 4 and 5, and Fig. 7 is also a vertical transverse section taken on the lines 7—7 of Figs. 3, 4 and 5.

Similar reference numerals in the several figures indicate the same parts.

In the present embodiment of the invention, a folding or pocket camera of a well known type is shown, 1 indicating the body thereof, 2 the bellows, 3 the lens tube and 4 the bed upon which the lens is supported when in operative position and which also constitutes a door for the body when the before mentioned parts are folded and housed therein. It is to this type of camera that our improvements are particularly applicable.

The bed 4 is provided with tracks 5 formed by laterally turned offset flanges on a track plate 6. Movable on these tracks is the carriage which, in the practice of our invention, is preferably made of a mono-block die casting 7 and provided with the following integral formations: two opposed inwardly turned hooks or jaws 8 on its bottom that engage the tracks 5 as shown and hold the carriage thereon though at all times permitting a free sliding movement thereof forwardly and rearwardly; two depressions 9 and 10 on opposite faces of the block, preferably roughened as indicated to constitute finger grip surfaces; a vertically disposed and vertically opening central slot or recess 11; a vertically disposed but laterally opening offset slot 12; an inner horizontal bore or recess 13 in the plane of and communicating with the recess 12, and a transverse bore or recess 14 intersecting the recess 12. A further large cutaway portion or under recess 15 may be provided but this is merely for the purpose of removing the metal and reducing weight.

The first mentioned slot 11 receives the lower tapered end of the lens board 16 that supports the lens tube 3, which lens board has a tongue extending through to the under side of the carriage block and riveted over as at 18. Pivoted in the laterally opening recess 12 on a pin 19 passed through the bore 14 is a locking plate or member 20 having an exteriorly arranged operating portion 21 and, behind it, a shoulder 22 upon which latter bears a plunger 23 occupying the inner recess 13 together with a spring 24 that thrusts the plunger outwardly. The normal tendency of the said spring is to thrust an engaging portion 25 on the locking plate downwardly into engagement with a stop plate 26 on the bed 4 when the carriage is in the neighborhood thereof. This stop plate 26 has an upwardly turned flange 27 parallel to the tracks 5 and provided with a series of stops 28 (Figs. 2 and 3) formed by spaced notches therein. The plate also bears graduations 29 associated with and appropriate to the stops and indicating proper focal distances of objects for different relative positions of the carriage and lens.

In operation, the carriage 7 is gripped by the surfaces 9 and 10 between the fingers and moved freely on the tracks 5 until the engaging portion 25 of the locking member 20 is adjacent to the stop flange 27. The operating portion 21 of the locking member constitutes a portion of, or is at least substantially continuous with, the grip surface 10 and hence is depressed against the spring 13 to raise the engaging portion 25, automatically during these movements. It is released by removal of the fingers and the engaging portion is allowed to drop into coöperation with such stop 28 as indicates at 29 the distance of the object to be photographed from the camera. This gives the position of the carriage for a corresponding focal distance of the lens from the sensitized recording surface and the carriage is locked against movement in either direction on the track until the locking device is again released by pressure on the member 21 when the finger is applied to the grip surface 10.

It will be observed that the finger grips have nothing to do with the direct engagement of the carriage and track which engagement, through the jaws 8, is always such as to permit free sliding movement.

We claim as our invention:

1. In a photographic camera, the combination with a bed having a series of stops thereon and associated graduations in units of focal distance, of a lens carriage movable freely on the bed and a locking device on the carriage adapted to coöperate with the stops on the bed, selectively to simultaneously lock the carriage and indicate the focus.

2. In a photographic camera, the combination with a bed having a track thereon and a series of stops paralleling the track and provided with associated graduations in units of focal distance, of a lens carriage movable freely formed by depressions on opposite sides thereof, and having a recess adjacent to one of said surfaces, a locking device adapted to coöperate with the bed to lock the carriage thereon arranged in the recess, and an operating portion on the locking device comprised within the depression of the last mentioned finger grip surface and constituting a substantially continuous part of said surface.

3. In a photographic camera, the combination with a bed, and a track thereon, of a lens carriage movable on the track and comprising a block having integral opposed track engaging jaws and relatively rigid finger grip surfaces on opposite sides thereof, and a locking device on the carriage adapted to coöperate with the bed to lock the carriage thereon and having an operating portion constituting a substantially continuous part of one of the finger grip portions.

4. In a photographic camera, the combination with a bed, of a lens carriage movable thereon and comprising a block having opposed and relatively rigid finger grip surfaces on opposite sides thereof and a recess adjacent to one of said surfaces, a locking device adapted to coöperate with the bed to lock the carriage thereon arranged in the recess, and an operating portion on the locking device constituting a substantially continuous part of the last mentioned finger grip surface.

5. In a photographic camera, the combination with a bed, of a lens carriage movable thereon and comprising a block having opposed relatively rigid finger grip surfaces on the track and having relatively fixed jaws engaging the latter, said carriage being further provided with relatively fixed finger grip surfaces on opposite sides thereof, and a locking device on the carriage adapted to coöperate with the stops on the bed, selectively, to simultaneously lock the carriage and indicate the focus, said locking device being provided with an operating portion having a finger grip surface substantially continuous with one of the first mentioned finger grip surfaces.

6. In a photographic camera, the combination with a bed, of a lens carriage movable thereon and comprising an integral block having a vertically disposed slot-shaped and laterally opening recess therein and a locking device adapted to coöperate with the bed to lock the carriage in fixed positions thereon and comprising a vertically disposed plate pivoted in the recess in the carriage and having an exteriorly arranged operating portion.

7. In a photographic camera, the combination with a bed, of a lens carriage movable thereon and comprising an integral block having an outer slot shaped and laterally opening recess therein and an inner recess communicating with the slot-shaped recess, a locking device adapted to coöperate with the bed to lock the carriage in fixed positions thereon comprising a plate pivoted in the outer recess in which it is adapted to be inserted edgewise and having an exteriorly arranged operating portion, and a spring arranged in the inner recess and acting upon the locking device to move it to engaging position.

WILLIAM A. RIDDELL.
ROBERT KROEDEL.

Witnesses:
HENRY L. THAYER,
JOHN A. ROBERTSON.